United States Patent [19]

Kobayashi et al.

[11] Patent Number: 4,470,554

[45] Date of Patent: Sep. 11, 1984

[54] SPINNING REEL WITH FINGER CONTROLLED DRAG

[75] Inventors: Takehiro Kobayashi; Kikuo Tsunoda, both of Hiroshima, Japan

[73] Assignee: Ryobi Ltd., Hiroshima, Japan

[21] Appl. No.: 403,395

[22] Filed: Jul. 30, 1982

[30] Foreign Application Priority Data

Aug. 4, 1981 [JP] Japan .................... 56/116646[U]

[51] Int. Cl.³ .................. A01K 89/01; A01K 89/02
[52] U.S. Cl. .................................................. 242/84.5 A
[58] Field of Search ............ 242/84.5 R, 84.5 A, 242/84.51 R, 84.51 A, 84.53; 188/71.5, 72.7, 72.8, 72.9

[56] References Cited

U.S. PATENT DOCUMENTS

| | | | |
|---|---|---|---|
| 683,940 | 10/1901 | Howe | 242/84.51 R |
| 2,656,993 | 10/1953 | Dukes | 242/84.53 |
| 2,863,617 | 12/1958 | Chapin et al. | 242/84.5 A |
| 2,918,227 | 12/1959 | Mauborgne | 242/84.5 A |
| 2,932,464 | 4/1960 | Mauborgne | 242/84.5 A |
| 2,988,298 | 6/1961 | Purnell | 242/84.5 R |

Primary Examiner—Billy S. Taylor
Attorney, Agent, or Firm—Sughrue, Mion, Zinn, Macpeak and Seas

[57] ABSTRACT

A spring biased lever 11 controls the axial compression force exerted on a drag force generating mechanism 18 via cooperating pairs of pivotally mounted operating and pressing levers 12, 16. The minimum drag may be set to a desired value by eccentric cams 24a rotated by a control knob 28 and which engage and act as limit stops for the pressing levers 16. A single finger of the rod gripping hand operates the drag lever, which may continuously increase and decrease the drag force above the preset level. The line spool 5 may be idled as there is no operative coupling between the rotor drive and the drag force generating or control mechanism.

4 Claims, 5 Drawing Figures

SPINNING REEL WITH FINGER CONTROLLED DRAG

BACKGROUND OF THE INVENTION

This invention relates to a drag device for a spinning reel in which the drag force is adjusted by operating a finger lever.

In a conventional drag device of this type, the rotor is braked by pulling on a lever which is pivotally mounted on the reel support leg. Accordingly, in order to turn the handle in the forward direction to retrieve or rewind the fishing line, it is necessary to release the lever to thereby allow the rotor to turn. This requires that the handle and the brake lever be operated in association with each other by both of the user's hands, which is considerably troublesome and difficult to coordinate.

SUMMARY OF THE INVENTION

An object of this invention is thus to provide a drag device in which a drag force generating mechanism in a reel body is operated by a drag lever, wherein the drag force can be readily controlled independently of the rotation of the handle.

Essentially, a spring biased lever controls the axial compression force exerted on a drag force generating mechanism via cooperating pairs of pivotally mounted operating and pressing levers. The minimum drag may be set to a desired value by eccentric cams rotated by a control knob and which engage and act as limit stops for the pressing levers. A single finger of the rod gripping hand operates the drag lever, which may continuously increase and decrease the drag force above the present level. The line spool may be idled as there is no operative coupling between the rotor drive and the drag force generating or control mechanism.

DETAILED DESCRIPTION OF THE PREFERRED EMBODIMENT

Figure 1:
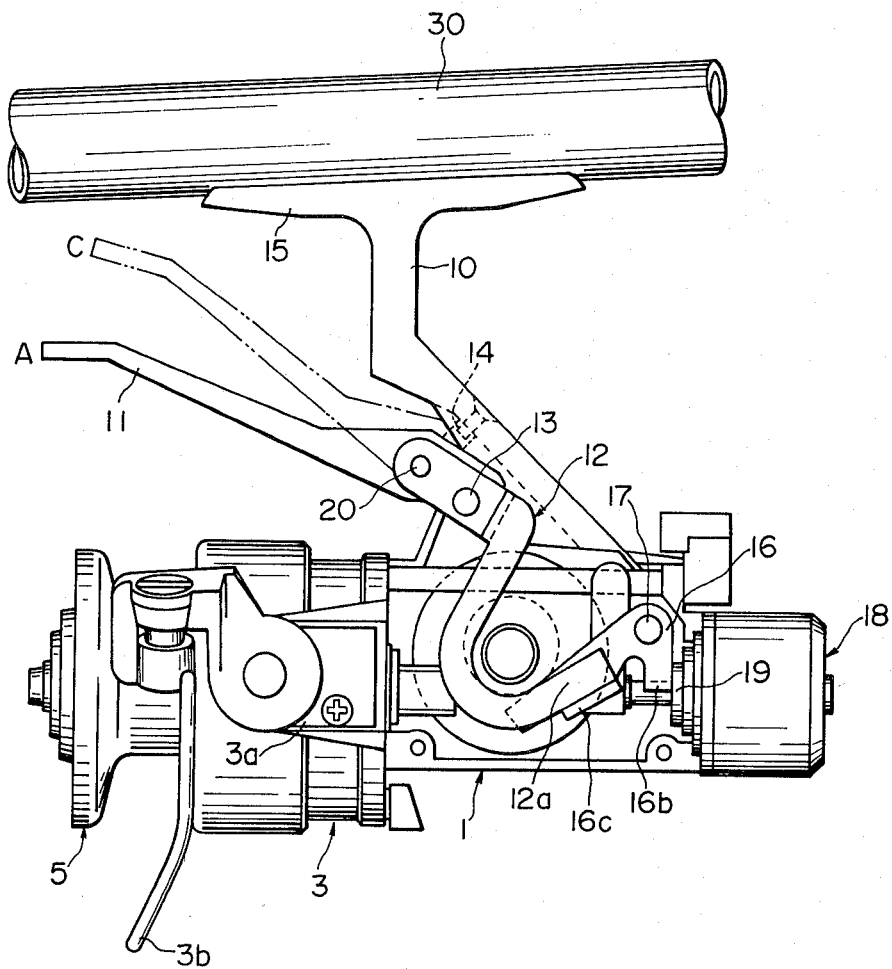
FIG. 1 shows a side view of a spinning reel with the gear box cover removed, provided with a drag device according to this invention.
Figure 2:
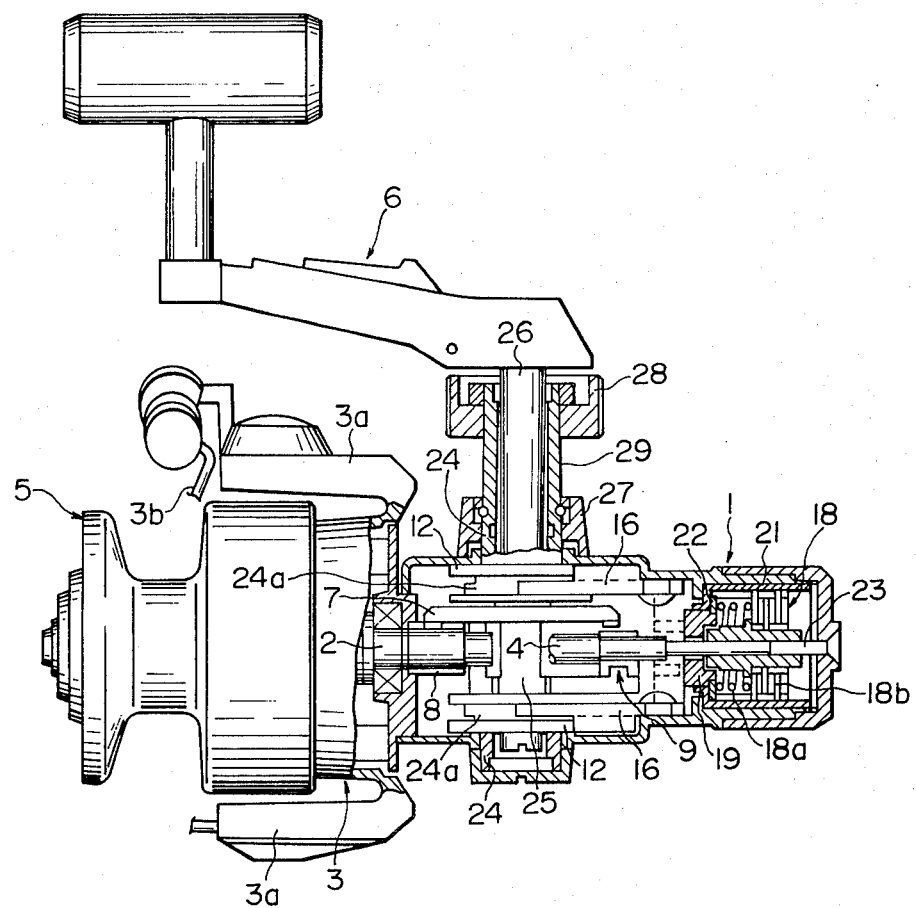
FIG. 2 shows a plan view, with parts cut away, of the reel of FIG. 1.

As shown in FIGS. 1 and 2, a spinning reel includes a rotor 3 rotatably supported on a box-shaped reel body 1 by a hollow shaft 2, and a spool 5 fixedly mounted on a main shaft 4 which is inserted into and extends through the shaft 2. As a handle 6 is turned, the rotor 3 is rotated through a pinion 8 of the shaft 2 engaged by a main ring gear 7. An oscillation means 9 reciprocates the spool 5 in a known manner so that a fishing line (not shown) laid over a bail arm 3b, which is pivotally mounted on the arms 3a of the rotor 3, is uniformly wound onto the spool.

A drag device according to the invention is constructed such that a drag lever 11 and a pair of operating levers 12 are rotatably and cooperably supported by a shaft, such as a stepped screw 13, on the middle portion of a reel mounting leg 10 which protrudes from the reel body 1. A spring 14 interposed between the drag lever 11 and the mounting leg 10 urges the drag lever away from a mounting shoe 15. A pair of pressing levers 16 are rotatably mounted on a support shaft 17 in the reel body 1, with one end portion 16a of each pressing lever engaged with the movable end portion 12a of the associated operating lever 12 which extends into the reel body through appropriate slots. The other end portion 16b of each pressing lever 16 abuts against the moving boss 19 of a drag force generating mechanism 18 which is incorporated in the reel body 1. When the drag lever 11 is pulled towards the mounting shoe 15 in FIG. 1 the pressing levers 16 press against the moving boss 19 to increase the drag force, and vice versa.

Figure 3:
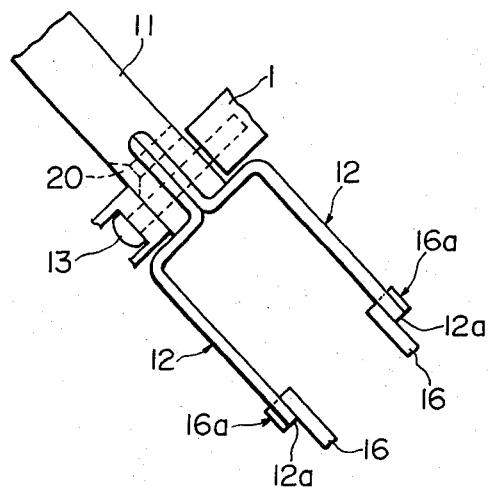
FIG. 3 shows a plan view of a drag lever and operating levers coupled thereto, in the drag device.
Figure 4A:
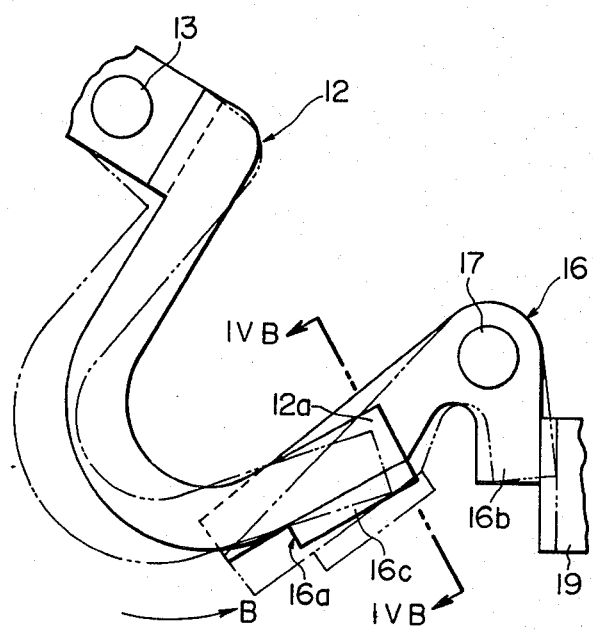
FIG. 4A shows a side view of an operating lever and a pressing lever in the drag device.
Figure 4B:
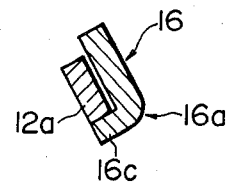
FIG. 4B shows a sectional view taken along line IVB—IVB in FIG. 4A.

In side view the operating levers 12 are generally U-shaped, and in plan view they are shaped like a semi-crank. Two operating levers, which are symmetrically arranged as shown in FIG. 3, are fixedly secured to the drag lever 11 by a screw 20, and are engaged with the bent portions 16c at the ends of the pressing levers as shown in FIG. 4B. Thus, the moving boss 19 is uniformly pushed by means of the two pressing levers 16.

The moving boss 19 is slidably mounted over the main shaft 4 as shown in FIG. 2, and is non-rotatably fitted with a washer 22. The washer 22 is non-rotatable and axially slidable in a holder 21. Thus, the moving boss 19 can compress or release the drag force mechanism 18 comprising a drag spring 18a and drag washers 18b. The holder 21 is non-rotatably housed in the reel body 1.

In the drag force mechanism 18, the drag washers 18b are provided between the holder 21 and a bushing 23 which is non-rotatably mounted on the main shaft 4, and the drag spring 18a is interposed between the washers 18b and the boss washer 22. When the moving boss 19 compresses the drag spring 18a, a drag force is generated which acts on the bushing 23, as a result of which braking force is applied to the spool 5 through the main shaft 4. When the compression of the drag spring 18a caused by the moving boss 19 is released, the drag force is decreased so that the spool can turn more freely.

The drag force can be set to a desired value. Hollow cam shafts 24 are rotatably disposed on both sides of the reel body 1 facing each other. The main ring gear 7 has a hollow shaft 25 and is rotatably mounted between the cam shafts 24. A handle shaft 26 is inserted through the cam shafts 24 and is fixedly secured to the hollow shaft 25. The end portions 16a of the pressing levers 16 abut against eccentric cams 24a of the cam shafts 24.

A collar 29 having a drag adjustment knob 28 on its outer end is rotatably coupled to one of the cam shafts 24 by a tightening nut 27, and fits over the handle shaft 26. As the knob 28 is turned the upper eccentric cam 24a is rotated in the arrangement shown in FIG. 2, and accordingly the maximum amount of drag reduced movement of the boss 19 is adjusted by the pressing levers 16 which are engaged with the eccentric cams as described above. Thus, the drag force generated by the mechanism 18 can be adjusted to a desired value. Handle 6, knob 28 and nut 27 can be released for reassembling these to the lower side of the reel body in FIG. 2. In this case, the lower cam 24a is operated.

When an excessive tension is applied to the line by a fish, the finger controlled drag lever 11 is released from position C in FIG. 1 and is returned to position A by the spring 14. Accordingly, the operating levers 12 are rotated in the direction of arrow B to the position indicated by the solid lines in FIG. 4A, and the pressing levers 16 are correspondingly moved to the solid line position by the drag spring 18a and the boss 19, whereby the drag force is reduced. The spool 5 can thus be idled, whereby even if the handle 6 is turned in the forward or retrieve direction, the fishing line is not rewound.

When the tension exerted on the line is decreased, the operating levers 12 may be rotated in a direction opposite to arrow B by fingering the drag lever 11 back towards position C. This turns the pressing levers 16 in a counterclockwise direction as shown in FIG. 4A such that their end portions 16b push the moving boss 19 against the elastic force of the drag spring 18a, whereby the drag force is increased to stop the idling of the spool 5 and the fishing line may be rewound. The drag force can thus be set to a desired minimum value with the drag knob 28 as described above, and controllably increased above this value by the finger manipulation or positioning of the lever 11.

With the spinning reel drag device according to this invention in which the drag force can be continuously adjusted by the operation of a lever, one finger of the hand that grips the fishing rod 30 can operate the drag lever 11 to adjust the drag force, and accordingly the other hand is free to operate the rewind handle 6. Furthermore, the drag lever 11 operates the drag force generating mechanism 18 with the aid of the operating levers 12 and the pressing levers 16, and the instantaneous drag force can be adjusted as desired with the set minimum drag force maintained. The operation of the drag lever 11 is completely independent of the rotation of the handle 6. Accordingly, unlike conventional reels, it is unnecessary to loosen or release the drag lever before the handle can be turned in the forward direction. Therefore, the drag operation can be performed quickly, readily following the motion of the fish, which contributes to the prevention of fishing line breakage and to an improvement in the fun of fishing. Finally, since the drag force generating mechanism 18 is controlled by an extended lever principle, the drag operation can be performed with only a small finger force.

What is claimed is:

1. A spinning reel, comprising:
   (a) a reel body (1),
   (b) a first shaft (4) rotatably mounted in the reel body and extending outwardly therefrom,
   (c) a line carrying spool (5) mounted on the outward end of the shaft,
   (d) a bail carrying rotor (3) mounted coaxially with the spool on a second shaft (2) coaxial with the first shaft,
   (e) means (6,26,7,8) for rotatably driving the second shaft and rotor,
   (f) means (9) for axially oscillating the spool,
   (g) support means (10,15) for mounting the reel body to a fishing rod (30),
   (h) finger controlled drag lever means (11,12) pivotally mounted on the support means and having one end thereof extending into the reel body,
   (i) an axially compressable drag force generating mechanism (18) mounted in the reel body between the body and the first shaft,
   (j) pressing lever means (16) pivotally mounted intermediate the ends thereof completely within the reel body with one end engaging said one end of the drag lever means and another end engaging the generating mechanism, whereby the movement of the drag lever means controls the axial compression of the generating mechanism via the pressing lever means and thereby the drag applied to the first shaft and spool, and
   (k) eccentric cam means (24,24a) mounted in the reel body proximate said one end of the pressing lever means for limiting the movement thereof in a drag force reduction direction to thereby establish a minimum drag force, and
   (l) adjustment means (28,29) for rotating the cam means to set the minimum drag force.

2. A spinning reel as defined in claim 1, wherein said one end of the drag lever means comprises a two armed yoke member (12) having a U-shaped in both plan and elevation, the pressing lever means comprises a pair of pressing levers, and the generating mechanism comprises an axially movable boss (19) disposed between said another end of the pressing lever means and a spring (18a) of the mechanism.

3. A spinning reel as defined in claim 2, further comprising spring means (14) disposed between the support means and the drag lever means for biasing the latter in a drag force reduction direction.

4. A spinning reel as defined in claim 1, wherein the distance between said one end of the pressing lever means and its pivotal mounting is greater than the distance between said another end of the pressing lever means and said pivotal mounting.

* * * * *